Inventor:
Carl W. Mott.
By Paul O. Pippel
Atty

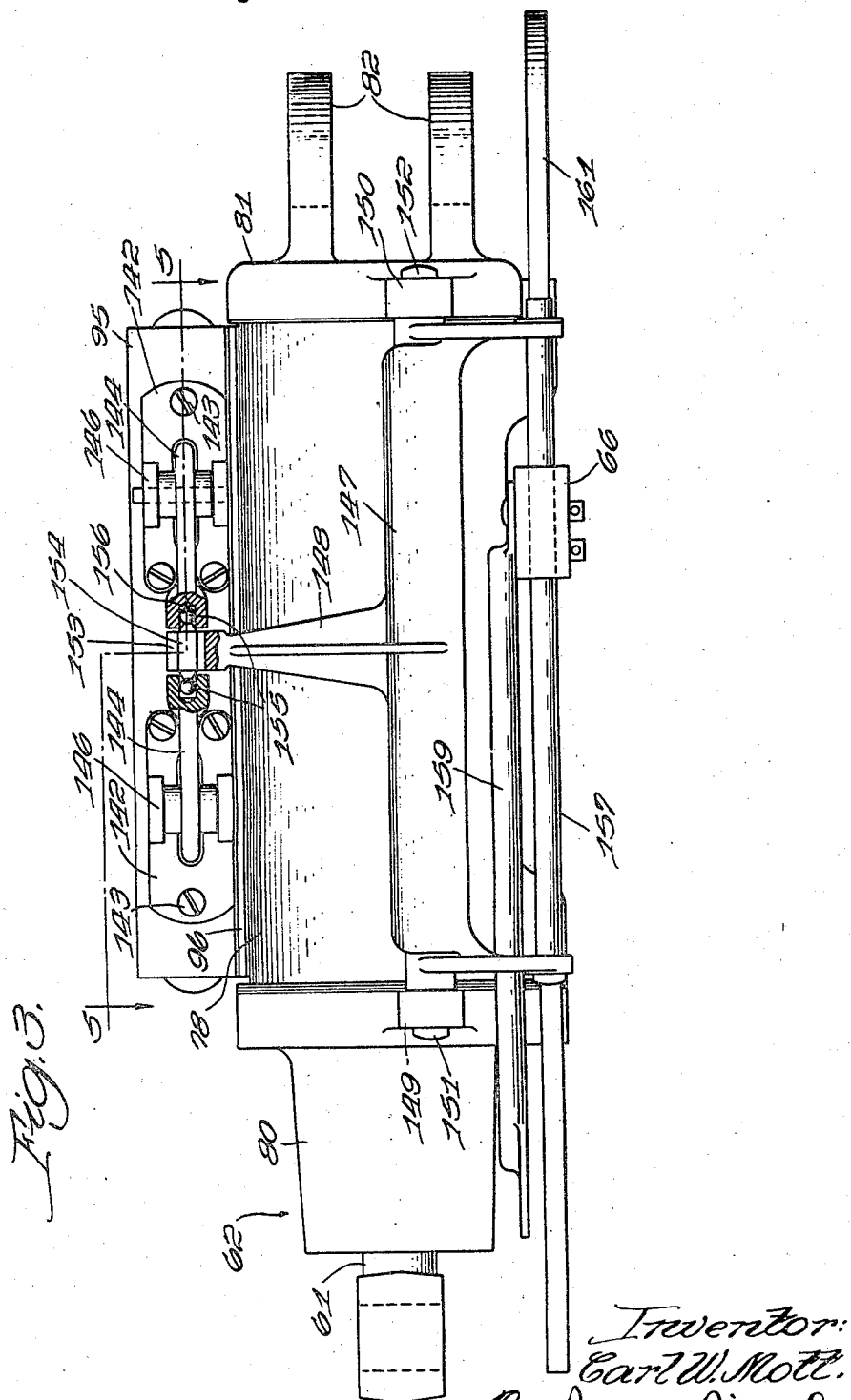

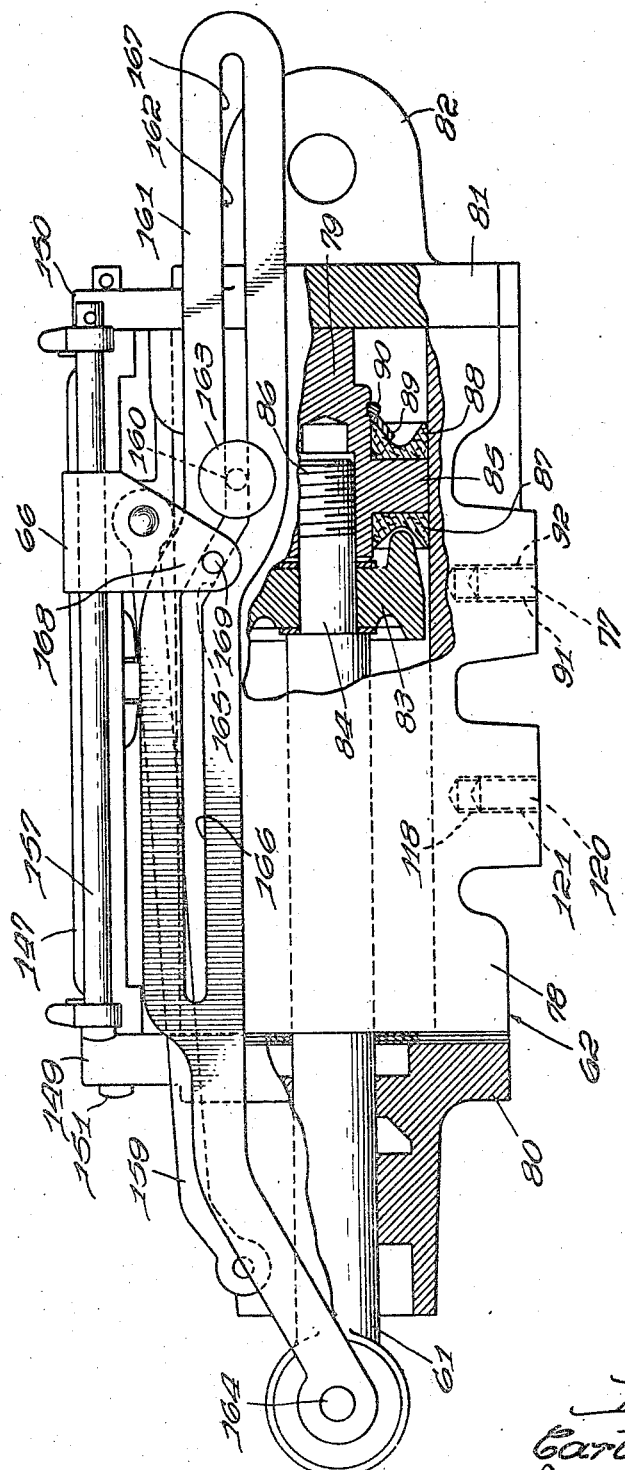

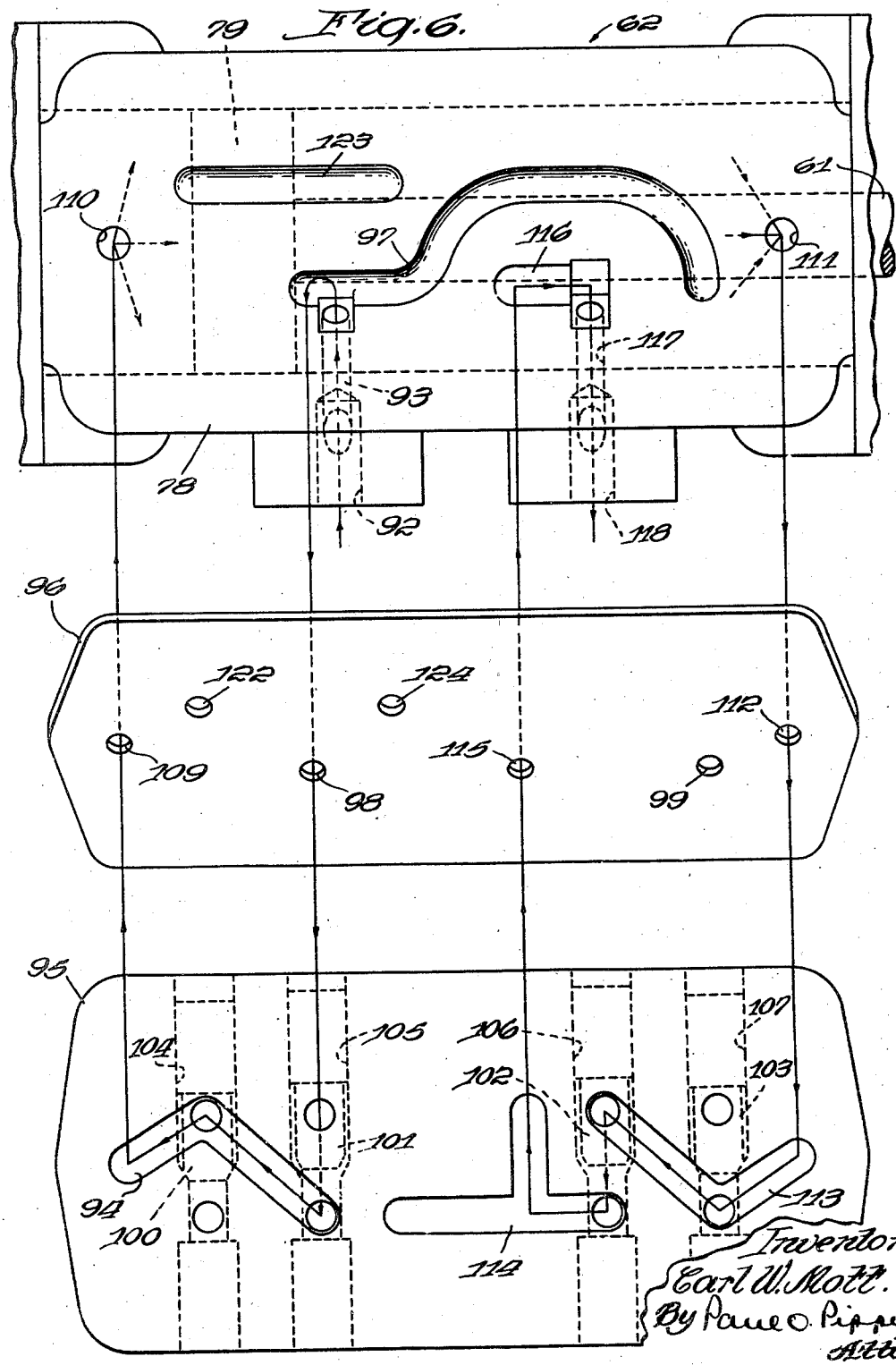

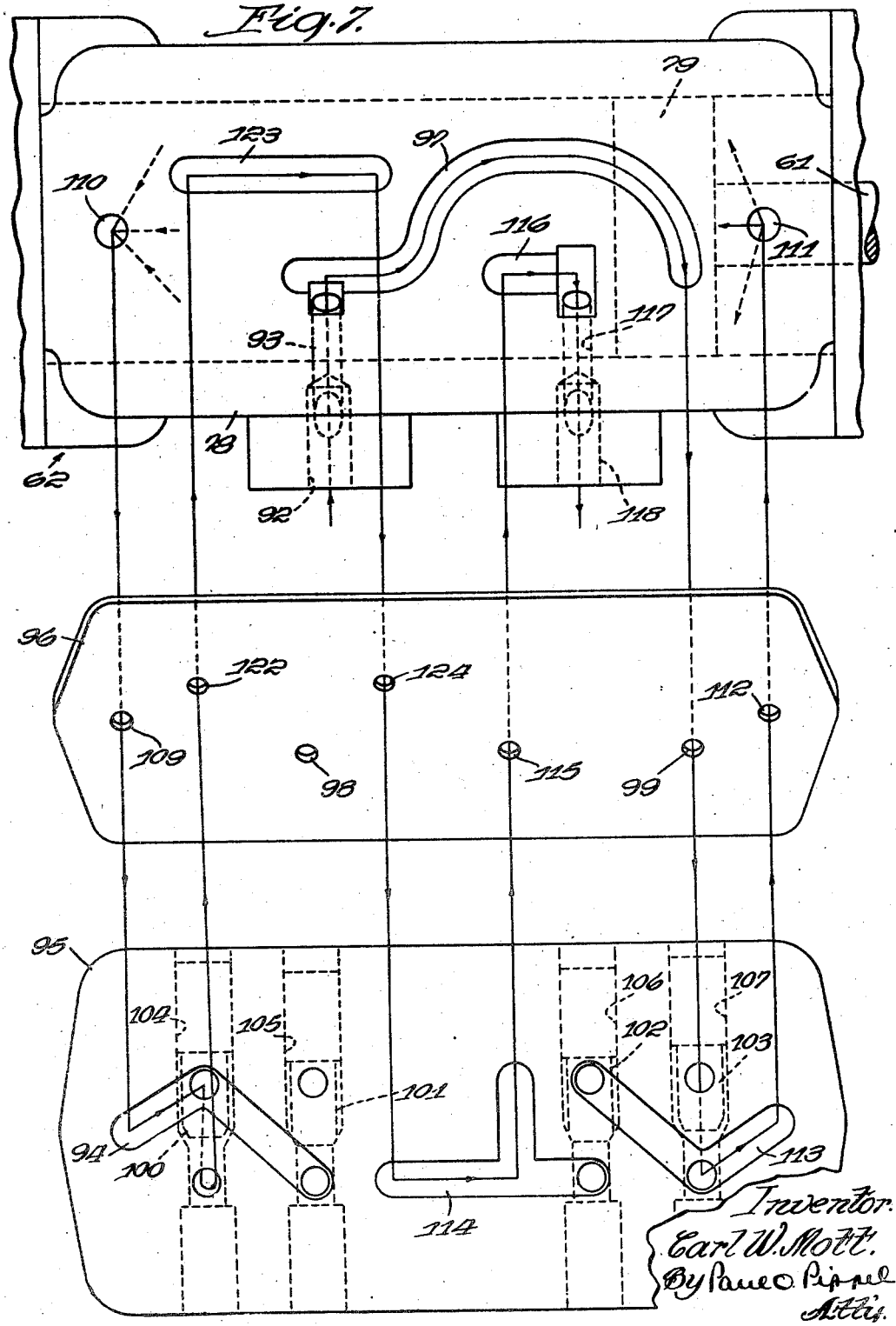

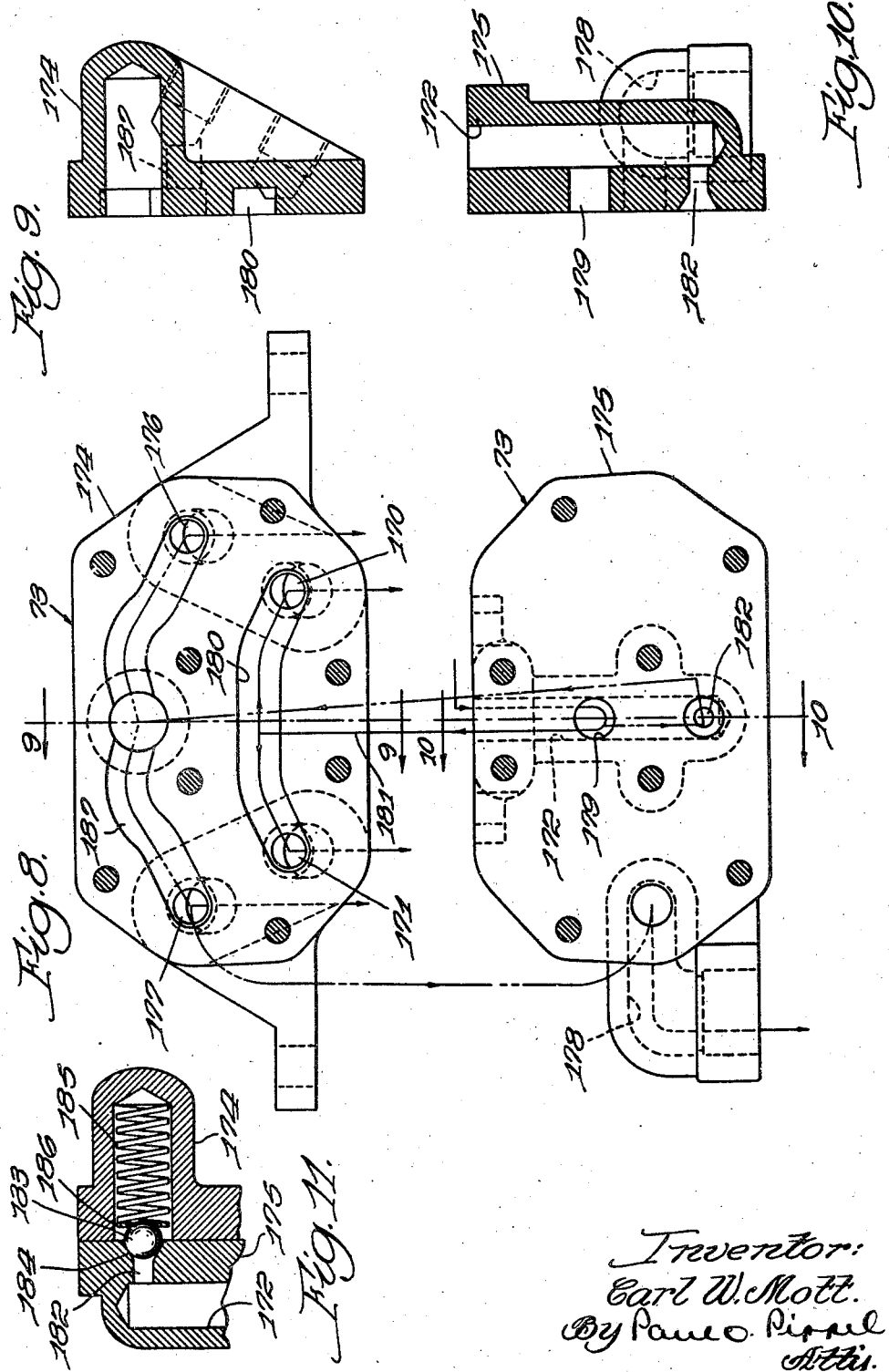

Patented Oct. 15, 1946

2,409,510

UNITED STATES PATENT OFFICE 2,409,510

POWER ADJUSTING MECHANISM

Carl W. Mott, La Grange, Ill., assignor to International Harvester Company, a corporation of New Jersey Original application November 21, 1942, Serial No. 466,463. Divided and this application March 22, 1944, Serial No. 527,625

5 Claims. (Cl. 97—50)

This invention relates to vehicle-mounted implements and, more particularly, to power-lifting and power-adjusting mechanism supplied with operating energy from a power plant associated with the vehicle. The present application is a division of my copending application, Serial No. 466,463, filed November 21, 1942, for "Power adjusting mechanism."

The general purpose of this invention is the provision of a mechanical organization for the practise of a new tillage technique. Vehicular tillage apparatus constructed according to the principles of this invention functions in a manner enabling an operator to manually control power derived from the vehicle power plant for positively controlling the working depth of a tillage tool both upwardly and downwardly coordinately with selective movement of a manual control member in respectively opposite directions. Such coordination between the direction and amount of movement of the manually controlled member and the direction and amount of depth adjustment of a tillage tool in a positive manner enables the operator to easily and uniformly control the tool depth in all kinds of soil. The apparatus is convenient for the operator, since irrespective of the character of the soil encountered, he can select the depth at which the tillage tool will be operated by the virtual effortless movement of a finger-pressed lever into a position corresponding to the desired depth.

Due cognizance is taken of certain prior art structures which employ manually controlled apparatus, which, by means of power derived from the vehicle engine, respond for mechanically controlling the depth. One example of this type of prior art is disclosed in the British Patent No. 19,410 (A. D. 1890). In the disclosure of this patent, water under pressure is selectively introduced into opposite ends of the cylinder of a reciprocable hydraulic motor piston for causing this motor to either lift or lower a tillage tool. However, the water is controlled in its flow to and from the motor cylinder by an ordinary slide valve which necessitates the manipulation of a valve control member from a neutral position for causing the water to drive the motor and the subsequent manual restorative manipulation of the control member to the neutral position for stopping the motor. The control lever and the motor work member or piston are not correlated both in direction and amount of movement, wherefore a time element is involved, namely, that the tillage tool will be raised or lowered, as the case may be, a distance depending upon the length of time the valve control member is displaced from the neutral position. Consequently, an operator of a vehicle having apparatus of this kind installed thereon must divert his attention from the course of the vehicle or other duties to observe the tools for ascertaining their effect while manipulating the valve control lever for causing a change in their depth. The operator cannot judge the time the valve is left open with sufficient accuracy for assuring that the tools will be set or reset to a desired depth.

In the present apparatus where there is coordination both in direction and amount of movement of the tools with respect to manual control member manipulation, this member can be reset at any time for positive precise resetting of the tools. This type of operation has been found particularly useful where the apparatus is operated in fields having areas of relatively hard and soft soil. When, for example, the operator arrives at the area of hard soil which he desires to till at a greater depth, he can, from the experience of one or more previous excursions across that hard area, know the exact setting he will want for the manual control member for obtaining the desired greater tool depth. He can therefore simply move the manual control lever to the desired position without observing the tools. He may, of course, when subsequently convenient, observe the tools to see that the desired tillage effect is being obtained. Since the apparatus functions to force the tools into the ground as well as to raise the tools by means of power derived from the vehicle engine, the just described technique can be practised in all types of soil.

Cognizance has also been taken of the prior art Patents Nos. 2,118,180 and 2,118,181 to Harry G. Ferguson, which disclose related apparatus in which a manual control member functions to cause movement of the tillage tools only in an upward direction, but, since the responsive movement of the tools also depends upon the magnitude of the draw-bar pull, the depth adjustment of the tools while in the soil is not necessarily uniformly correlated with the movement of the control member. Also the Ferguson apparatus depends upon the weight and "suction" of the tools for causing them to dig more deeply into the ground and for this further reason cannot be utilized for accomplishing the aforesaid purpose of the present apparatus.

This applicant is also aware of manually controlled power apparatus employed in other arts to obtain powered movement of a driven member in either of opposite directions in an amount correlated in both direction and amount with the movement of an oppositely movable control member. Notable of such arts is hydraulic steering, and for an example, reference may be made to United States Patent No. 529,495 to Byron Jackson.

A further object of this invention is the provision, in a hydraulic system for controlling the elevation of a tillage tool, of valve means having variable delivery successively operable flow rate stages for controlling the energization and speed of the fluid-driven motor which changes the elevation of the tool, and wherein the flow rate in each stage is variable, making it possible to employ the stage of less flow capacity for obtaining small adjustments of the tool while it is in the soil-tilling position.

These and other desirable objects inherent in and encompassed by the invention will be more clearly understood upon reading the ensuing description with reference to the annexed drawings, wherein:

Figure 3 is an enlarged plan view of the fluid operated device together with its valve mechanism;

Figure 4 is an enlarged view in elevation of the fluid operated device taken of the same side exposed in Figure 2 but with a portion of its cylinder structure broken away to show the piston within the same;

Figure 6 is an unfolded view of the valve mechanism illustrating the flow of fluid therethrough pursuant to causing piston movement in one direction;

Figure 7 is a view similar to that of Figure 6 with the valve mechanism conditioned for directing the flow of fluid (indicated by the arrows) so as to cause the piston to move in the opposite direction;

Figure 8 is an unfolded view of the distributing head in the tractor intermediate housing, with lines illustrating the flow of fluid through the same;

Figure 9 is a sectional view taken along the line 9—9 of Figure 8;

Figure 10 is a sectional view taken along the line 10—10 of Figure 8;

Figure 11 is a fragmentary view in section of the distributing head of Figure 8, showing the bypass valve thereof.

Figure 1:
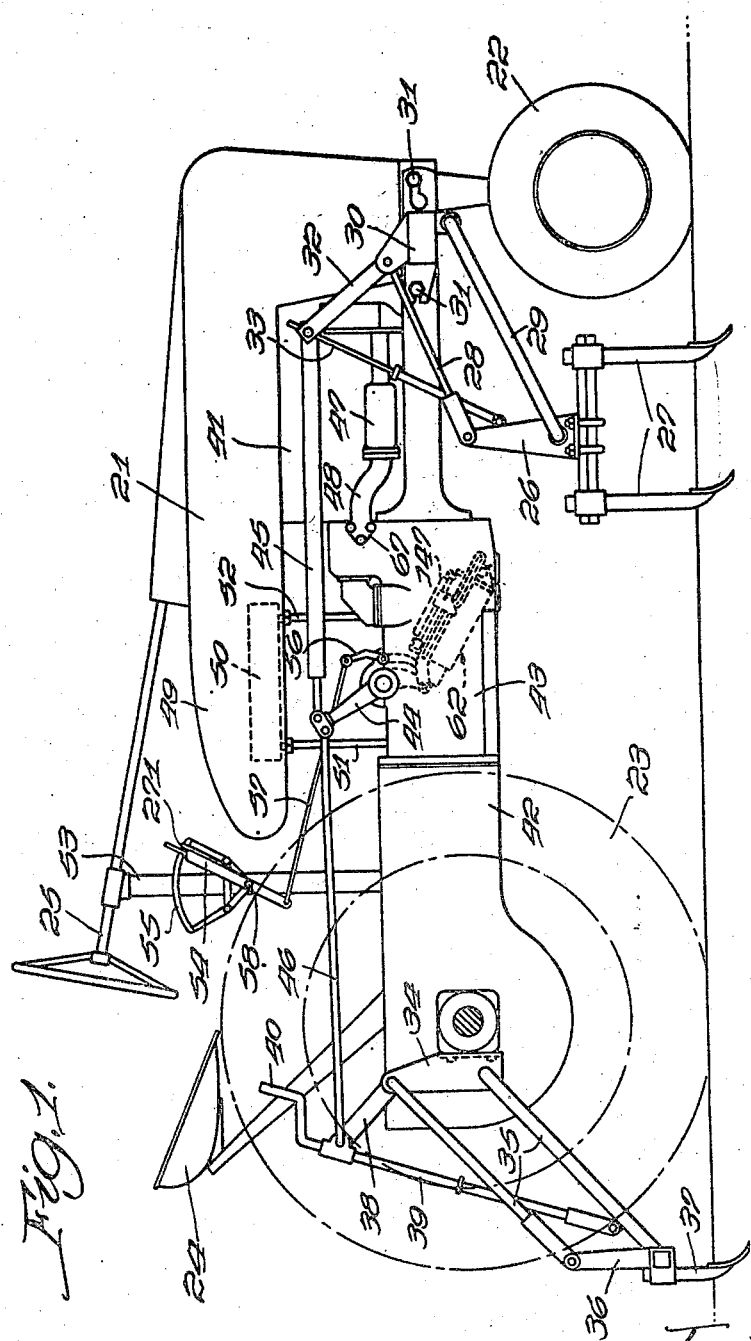
Figure 1 is a view in elevation of a tractor or tool-supporting structure with a working tool connected thereto and with the fluid-operated arrangement of the present invention arranged for moving the working tool.

With continued reference to the drawings, there is shown in Figure 1 a tractor or tool supporting structure 21 of a character suitable for embodiment in the invention. This tractor includes a dirigible supporting truck at its forward end with wheels 22 and also includes traction wheels 23 which provide support at the rear.

Connected with the dirigible wheels 22 and extending from an operator's station 24 on the rearward portion of the tractor is a steering mechanism 25 for controlling the path of movement of the tractor. To the forward portion of the tractor is connected for vertical movement a working tool structure 26 having working tools 27 thereon. The connection of the working tool structure with the tractor is made by means of upper and lower parallel links 28 and 29 connected to a bracket structure 30 secured to the forward portion of the tractor by means of clamping bolts 31. On the bracket structure 30 is a lifting lever 32 pivoted for fore and aft movement and connected to the working tool structure 26 by means of a lift rod 33.

On the rear portion of the tractor is connected a bracket structure 34 to which is connected, by means of parallel links 35, a rear working structure 36 having a working tool 37 thereon. Similarly, there is on the bracket structure 34 on the rear of the tractor a fore and aft pivoted lever 38 connected to the lower parallel link 35 by means of an adjustable lift rod 39 having a handle portion 40 accessible to the operator's station 24. By means of this handle portion 40, an adjustment may be made of the rear working tool structure independently of the forward working tool structure.

The tractor 21 has the usual power plant 41 and a longitudinally extending body portion 42. This body structure 42 includes an intermediate housing 43 in which are mounted parts of the fluid power arrangement to be described more in detail hereinafter. Extending from the housing 43 and pivoted thereon for fore and aft pivotal movement is a lifting arm 44 connected respectively with the pivotable levers 32 and 38 by means of horizontal lift rods 45 and 46. Adapted to be operated by the tractor motor is a fluid pump 47 having communications with the intermediate housing 43 by means of a communicating pipe 48. Within a fuel supply tank 49 there is a fluid reservoir housing 50 arranged for communication with parts within the intermediate housing 43 by vertically extending pipes 51 and 52. On a steering rod supporting post 53 is mounted a control lever 54 manually adjustable along a quadrant 55 for operating a lever 56 pivoted on the intermediate housing 43 and connected inside the housing with the parts of the fluid power arrangement in a manner brought out hereinafter. The connection of the lever 54 with the lever 56 is made by a rod 57 connected to the lower end of the lever 54. The lever 54 is pivoted at 58 on the quadrant 55.

Figure 2:
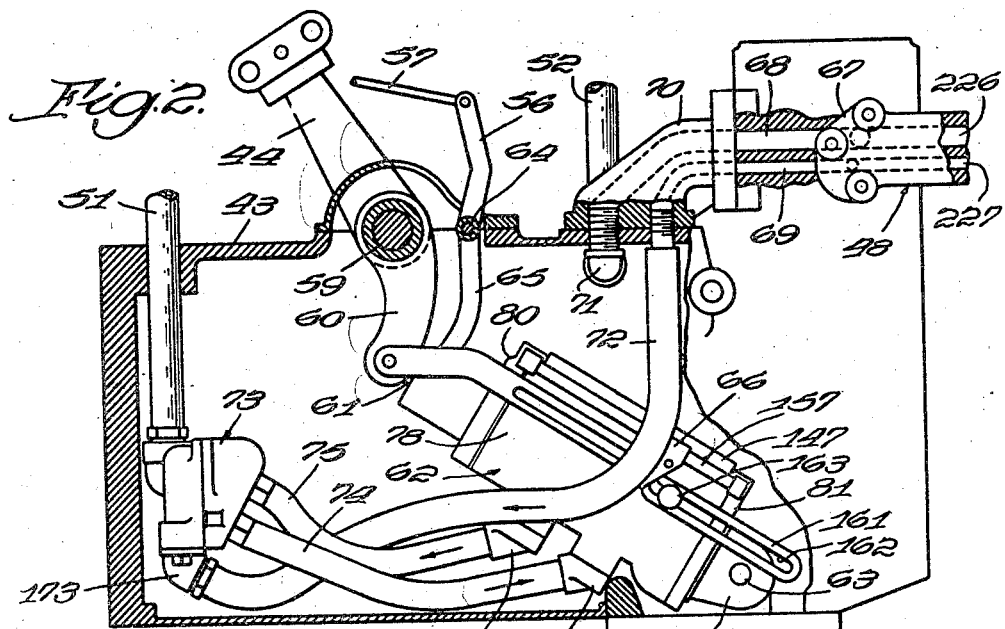
Figure 2 is a view in elevation of the intermediate housing of the tractor with a portion thereof cut away to show a fluid operated device and other parts of the fluid operated arrangement which are used therein.

Referring now particularly to Figure 2, there is shown an enlarged view of the intermediate housing 43 with a portion of the same broken away to show parts of the fluid power arrangement therein. This housing 43 is of sturdy construction since it is a part of the body portion which must withstand the usual strains common to tractors of this type. The lever 44 is pivoted to the upper portion of the housing 43 as indicated at 59 and has a lower end 60 to which is coupled a piston rod 61 of a fluid power or fluid operated arrangement or device 62 mounted within the housing and pivoted to the same as indicated at 63 in an inclined position. The lever 56 is likewise pivoted to the upper portion of the housing 42 as indicated at 64 and has a depending portion 65 which is connected to a longitudinally movable follower element 66 located on the fluid operated device 62, the function of which will be described hereinafter in connection with the description of the fluid operated device itself.

For the sake of compactness, the fluid communication pipes 48 are connected to the housing 43 as indicated at 67 and are in communication with corresponding pipe openings 68 and 69 formed through the housing 43. For further communication of the fluid from the passages 68 and 69, there is a communication block 70 connected to the top part of the body housing 43. Fluid from the reservoir 50 is delivered through the pipe 52 and a coupling 71 to a passage within the block 70 for delivery to the passage 68 and thence to the pump 47. Fluid is returned from the pump to the passage 69 under pressure and thence through the block 70 and a supply hose 72 which communicates with a distributing valve 73. From this distributing valve 73 fluid is delivered under pressure through a hose 74 to the fluid operated device 62. From the fluid operated device 62 the fluid flows through a hose 75 and the distributing valve 73 and thence through the vertical pipe 51 for return to the fluid reservoir 50 in the fuel tank 49.

As the fluid is distributed under pressure to the fluid operated device 62, the arms 44 on the intermediate housing 43 will be adjusted thereby fore and aft, and since the working tool structures on the forward and rearward portions of the tractor are connected to these arms, these working tool structures will be adjusted by the power of this fluid actuated device 62. The amount of movement of the working tools is limited only by the maximum stroke of the piston rod 61 whereby the working tools are moved from one extreme position to another extreme position with respect to the tractor. This movement of the working tool structure is initiated by the manual lever 54 operated from the operator's station 24 although it should be understood that the actual movement of the working tools is done by the power device itself. In a manner to be hereinafter described, the lever 54 can be set at any position on the quadrant 55, and this movement will be reflected in the valve control mechanism associated with the fluid power device 62 so that a corresponding movement of said power device and working tools will be had.

Figure 5:
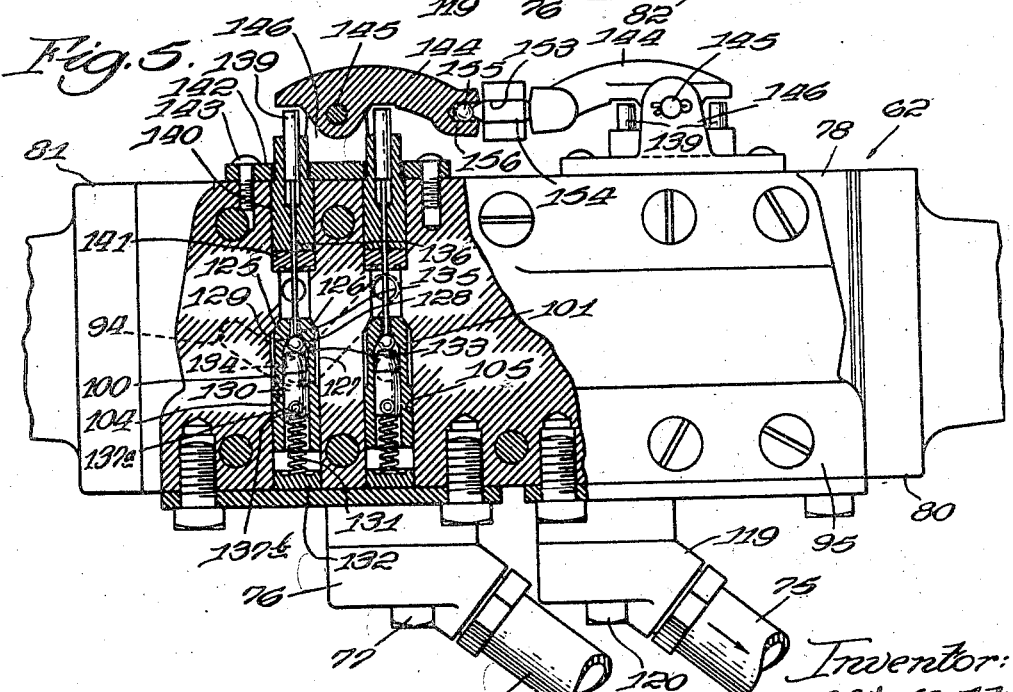
Figure 5 is a side elevational view of the fluid operated device looking in the direction opposite to that shown in Figure 2 and with a portion of the valve mechanism broken away for clarity, the view being taken generally along the line 5—5 of Figure 3.

Referring now particularly to Figures 3, 4, and 5, a description will now be made of the fluid actuated device 62 and of the valve mechanism therefor, and by assuming that fluid is already provided under pressure in the communicating hose coupling 74 for delivery to the fluid operated device 62. The communicating hose coupling 74 connects with the fluid operated device by means of a coupling 76 secured to the device by means of a clamping bolt 77. The fluid operated device includes generally a cylinder housing 78 and a piston structure 79 secured to the inner end of the piston rod 61. The piston rod is slidable through a cylinder head 80 which closes one end of the cylinder structure 78. The opposite end of the cylinder structure 18 has a head member 81 with a lug 82 serving to connect the device with the intermediate housing 43, as previously mentioned, at 63.

The piston structure 79 may be of any known type adapted for double acting cylinder devices, but in the present instance includes a ring 83 which fits over a narrowed portion 84 of the piston rod and is made fast thereto by a main piston element 85 threaded as indicated at 86 to the portion 84. Associated with this main piston element 85 are wiping rings 87 and 88, the former being retained by the ring 83, while the latter is retained by a washer 89 and a ring 90 secured to the main piston element 85. As viewed in Figure 4, the clamping bolt 77 is threaded into a threaded recess 91 directly upwardly into the cylinder structure from the lower edge of the same. Adjacent the threaded recess 91, Figure 6, is a fluid communicating opening 92 into which fluid passes from the hose 74, and thence through a passage 93 to an angle-shaped passage 94 in a valve housing 95 which is adapted to be secured to the cylinder structure 78 with a partition plate 96 secured therebetween. This partition plate 96 has several fluid passing holes arranged for communication between respective other passages, as the passage 94, formed in respective flat faces of the valve housing structure 95 and of the cylinder structure 78. By using the partition plate 96 the difficult task of coring holes within castings is eliminated. The passages may be simply impressed or cast into flat or complementally fitting faces of the structures adapted to be seal-pressed together, and the fluid passages themselves are completed on opposite sides of the partition plate 96 by virtue of the same being secured therebetween. Hence, in the manufacture of the power device the necessity for coring of openings in order to provide passages for the fluid has been eliminated. All of this has lessened the cost of a more or less complicated structure and has brought the same within the price range of fluid-operated devices of the more simple type.

Referring now particularly to Figure 6, the fluid on entering the passages 92 and 93 is first communicated to a longitudinally extending cavity or impression 97 in the exposed flat face of the cylinder structure 78. From this impression 97 it may be delivered either through a hole 98 or a hole 99 in the plate 96. Assuming fluid passes in the direction of the arrows through the hole 98, it comes into communication with the angled impression 94 in the valve housing 95. This valve housing 95 has four valves 100, 101, 102, and 103 within chambers 104, 105, 106, and 107, respectively, of the valve structure 95. Fluid upon leaving the impression 97 passes through the opening 98 in the plate 96 to the valve chamber 105 and past the valve 101, which is open, to the impression 94 on the face of the valve structure 95. From this impression 94 it is delivered through an opening 109 in the plate 96 to a passage 110 in the left-hand or front end of the cylinder structure from which it is discharged into the cylinder structure to act upon the piston 79.

For work to be performed upon the piston 79 there must be a release of fluid on the end of the piston opposite to that against which fluid is impressed for producing a work stroke. This is accomplished by fluid passing from the opposite end of the cylinder structure, corresponding to said opposite end of the piston, through a passage 111 thereof, thence through an opening 112 in the plate 96 and for delivery to an angled impression 113 on the face of the valve structure 95. From this impression 113, the fluid passes the valve 102 for delivery to an intermediate T-shaped impression 114 in the valve structure 95. From this T-shaped impression 114 fluid passes through an opening 115 in the plate 96 to an impression 116 on the face of the cylinder structure, downwardly through a vertical passage 117 to an outlet port 118. This outlet port 118 is in communication with a hose coupling 119 secured to the cylinder structure by means of a clamping bolt 120 seated in an opening 121, Figures 4 and 5. From the opening 118 fluid then passes through the coupling 119 to the hose connection 75 to be delivered to the distributing valve 73 for return to the fluid reservoir 50. As viewed in Figure 6, it will be noted that upon the introduction of fluid to the cylinder through the opening 110 and the exhaust of fluid from the cylinder through the opening 111, the piston 79 will be moved to the right or rearwardly, or, as viewed in Figures 4 and 1, will be moved to the left or rearwardly to rock the arm 44 for raising the working tools.

Should the piston 79 be projected forwardly or to the left, as viewed in Figure 6, when a lowering of the working tools is desired, the fluid will take a path through the valve structure as now to be described with reference to Figure 7. To effect movement of the piston to the left, referring to Figure 7, the fluid which always enters the vertically extending opening 92 will be delivered through the long impression 97 to the opening 99 in the plate 96, instead of to the opening 98 of the plate 95, and then through the valve chamber 107, and past the valve 103 to the angled impression 113 for delivery through the opening 112 in the plate 96 to the passage 111 in the cylinder structure 78. From this passage 111 it is discharged into the cylinder structure to act upon the piston for effecting movement of the same to the left. Simultaneously with movement of the piston in this direction fluid leaves the cylinder structure from the opposite end of the piston and does so through the opening 110, opening 109 in the plate 96, impression 94, piston valve 100, valve chamber 104, an opening 122 in the plate 96, and thence into an axially extending impression 123 in the cylinder structure 78 from which it passes through an opening 124 in the plate 96 to the T-shaped impression 114 in the valve structure 95. From the T-shaped impression 114 the fluid discharge continues through the opening 115 to the impression 116 in the valve structure and thence downwardly through vertical openings 117 and 118 to the return hose connection 75. It should now be apparent that valve mechanism has been provided for controlling the flow of fluid for moving the piston 79 in either of its reciprocal directions within the cylinder 78.

Referring now to Figure 5, a description of the valve arrangements 100 to 103 will be made with particular reference to the arrangement 100, since these four valve arrangements are identical. The valve 100 is cylindrical and is tapered on one end, as indicated at 125, for contact with a conical seat 126 formed in the valve housing 95. For a portion of its length, adjacently to its tapered portion 125, the valve is of smaller diameter than the valve casing bore 104 in which it is reciprocal, to provide a passage for fluid around this portion of the valve upon the same being opened by the breaking of its contact with the seat portion 126. When the valve is closed, this smaller diameter portion of the valve, together with the valve casing bore 104, provides an annular fluid chamber 127 about the valve 100, and this chamber is in communication with certain of the holes as 98 and 109 in the plate 96.

Within the valve 100 there is a secondary ball valve 128 normally retained against its seat 129 by a spring-pressed plunger 130 to the lower end of which is connected a compression spring 131 which reacts against a plug 132. This secondary valve is so designed in the valve 100 in order to provide an arrangement whereby the main valve 100 may be opened with the least expenditure of energy, thereby making possible the use of operating devices of minimum dimension for operating the valve. A hole 134 in the valve provides communication between the chamber 127 and a chamber 133 bounded in part by the valve seat 129. The chamber 133 has a narrow opening 135 in the upper part of the valve 100 through which fluid is transmittable to the upper part of the fluid-containing valve bore 104. Through this opening 135 there extends a vertical operating rod 136 which contacts the ball 128 and which, when pressed downwardly, serves to unseat the ball 128 from its contact 129 on the valve 100. As the ball 128 is unseated, fluid under pressure will at first pass upwardly through the narrow opening 135 until sufficient back pressure is built up above the main valve 100 to materially contribute to the lowering of the same for breaking the contact of the tapered portion 125 with the valve seat 126. The downwardly displaced ball forces the plunger 130 downwardly, first an initial amount to bring the upper side of an oversize opening 137$^a$ extending diametrically through the plunger into contact with a pin 137$^b$ traversing said opening and having its ends fastened in the valve member 100. Then, after the building up of said back pressure above the valve member tending to slide it downwardly, comparatively little additional force applied downwardly through the rod 136, ball 128, plunger 130, and the cross-pin 137$^b$ is necessary to cause the valve member 100 to move downwardly to unseat it at 126 and thus provide direct communication between the annular chamber and the upper part of the valve casing bore 104.

As a means for operating the rods 136 there are provided plungers 139 reciprocally carried in a sealing block 140 through which the rod 136 extends. This sealing block 140 is located in the upper end of the valve casing bore 104 and bears against a sealing element 141. Pairs of the sealing blocks 140 are retained in place by respective plates 142 secured to the upper part of the valve housing by means of screws 143. The plungers 139 are normally retained vertically upwardly by the action of the spring 131. The valves are arranged in pairs and from them there extend two of the control plungers 139 spaced axially of the cylinder structure 78 and accessible at the top of the valve structure 95. Each pair of plungers is controlled by a lever 144 pivoted on a pin 145 supported by a lug 146 mounted on the plate 142. Each lever is alined longitudinally with the tops of its respective plungers 139 and as the same is rocked about its pivot pin 145 either one or the other of the two plungers 139 will be depressed against the action of the associated compression spring 131.

Mounted on the upper side of the cylinder structure 78 for pivotal movement about an axis parallel with that of said structure is a main operating lever 147, Figures 1, 2, and 3, having a laterally extending arm 148. The pivotal connection is made to lugs 149 and 150 located respectively on the head members 80 and 81 of the cylinder structure, and by means of pins 151 and 152. This pivoted operating member 147 therefore spans a substantial distance lengthwise of the cylinder structure.

The arm 148 has in its outer end a horizontally extending slot 153 adapted to receive a connecting element 154 having ball-shaped ends 155 for making universal joint connections respectively with the inner ends of the levers 144, the ball ends 155 being inserted within recesses 156 of the levers. As the lever 147 is rocked, the outer end of its arm 148 will move either upwardly or downwardly for pivoting the levers 144. If the arm 148 moves downwardly, the plungers 139 on the inner sides of the pins 145 will be depressed, whereas if the arm 148 is moved upwardly the plungers 139 at the outer sides of the pins 145 will be depressed. In either movement of the arm 148 one plunger 139 of each pair will be moved.

One form of means will now be described which employs cooperable and independently movable counterparts, respectively manually controlled and constrained for movement with the motor piston, for manipulating the valves in the motor casing in such a manner that the said piston or work member will be driven coordinately in direction and distance with the direction and distance of adjustment of a manual control member (54, Fig. 1) connected with the manually controlled counterpart. Another form is disclosed in my copending application Serial No. 516,470, filed December 31, 1943, for Fluid control apparatus.

On the pivoting operating structure 147 is a longitudinally extending rod 157, Figures 1, 2, 3, and 4, on which is slidable the adjustable stop or cam follower member 66 connected to the lower end of the lever 56 by means of a connecting link 159. This link 159 can thus be operated by the lever 56 to adjust the follower 66 along the rod 157, the lever 56 being connected to the manual adjustable lever 54. It will thus be apparent that movement of this follower 66 will be corresponding in amount to the amount of movement of the lever 54 over the quadrant 55.

Projecting laterally from the cylinder structure 78 is a guide pin 160 on which is supported the free end of an elongated cam 161 having a cam slot 162 through which the pin 160 extends. The projection 160 has a flared outer portion 163 to positively hold the cam 161 against lateral deflection. The back end of the cam 161 is connected to the piston rod 61 as indicated at 164 whereby it will be movable with the piston rod and piston 79. The cam slot 162 has an intermediate neutral portion 165 disposed angularly with respect to offset parallel portions 166 and 167. It will be observed that the cam follower element 66 is folded about the rod 157 to be adjustably slidable thereon and has two opposed depending portions 168 which straddle the cam 161 to support a pin 169 in the cam slot 162. This pin 169 is arranged to ride in the cam slot 162 so that as the manually controlled lever 54 is pivoted to adjust the cam follower 66 lengthwise of the rod 157, the pivoted structure or lever 147 will be pivoted on the pivot pins 151 and 152 to cause up or down movement of the arm 148, this being effected by the reaction of the pin 169 against the edges of the cam slot 162.

The normal position of the follower 66 is that shown in Figure 4 but as it is adjusted rearwardly or to the left the pin 169 will ride upwardly on the inclined neutral portion 165 to effect downward movement of the arm 148 so that the two inner plungers 139, Figure 5, will be operated. Should the operator move the follower so that the pin 169 moves downwardly along the neutral portion 165, the upper edge of the cam slot will pivot the structure 147 so that the arm 148 moves upwardly thereby operating the outer plungers 139. As this takes place the operation of the piston will begin and will not stop until the cam 161 has been moved so that the pin 169 is again in the center of the neutral or inclined portion 165 of the slot. If the cam follower 66 is moved to the left as viewed in Figure 4, the piston will move to the left until the portion 165 of the slot has returned the cam follower and the pivoted structure 147 to the neutral position. Similarly, if the cam follower 66 is moved to the right, the piston 79 would move to the right, assuming that it had not already been completely returned to the right side of the cylinder structure as viewed in Figure 4.

As the inner plungers 139 are depressed, the valves 101 and 102 are opened as viewed in Figure 6, and fluid automatically flows as traced in Figure 6 to the port 110 to act against the piston 79 to the right, or to the left as viewed in Figure 4. When the outer valves 100 and 103 are depressed, the flow of fluid is as illustrated in Figure 7, that is, to the piston rod end of the cylinder structure to move the piston 79 to the left, or to the right as viewed in Figure 4.

The valve balls 128, in addition to serving as an initial opening means for the valve means as 100, also cooperate with the valve members 125 in providing flow rate stages in which such valve means may be operated and corresponding speed stages in which the force transmitter 79, Figure 4, and the part 37, Figure 1, are adjustable. When the valve means is operated in an initial stage in which the valve stem 136 thereof is depressed far enough for unseating only the associated ball 128, only a small maximum amount of fluid can flow past the valve means for introduction into and exhaust from respective ends of the cylinder to incur relatively slow movement of the piston or force transmitter 79 and the tool or adjustable part 37. In certain installations such slight or micrometer adjustment of the tool is highly desirable, and in such installations it is also sometimes desirable to cause the tool to move at a relatively high rate of speed. With the present apparatus, the higher rate of movement is obtainable at will simply by moving the manual control lever to advance the cam follower 66, Figure 4, in the direction the cam member 161 is being moved by the force transmitter 79 but at a greater speed, whereby the diagonal portion of the cam slot 162 will be effective for depressing the valve stems 136 of the already opened valves more distantly for likewise depressing the balls 128, the plungers 130, the pins 137$^b$, which will be thus ultimately engaged by the upper sides of the oversize openings 137$^a$, and hence the valve members 125 for unseating said members 125 from their seats 126 to place the valves in their second operating stage having the much increased flow rate. The flow rate in either range is variable according to the speed at which the manual control member is moved. For instance, while the apparatus is operating with only the balls 128 unseated, the distance they are unseated may be varied by slightly accelerating or decelerating the speed of the manually controlled finger grip lever 54. The fluid flow speed and hence the piston speed may be kept constant by moving the manual control lever 54 at such uniform speed that keeps the pin 169, Figure 4, in fixed relation with the diagonal cam slot portion 165 in which it is rideable, that is, to move the pin 169 in the same direction and at the same speed at which the motor piston 79 moves the cam member 161. If the manual control lever is decelerated from this uniform speed, the cam member 161 will gain upon the pin 169 to allow the balls 128 to approach their seats, throttling the fuel flow and decreasing the piston speed. If the manual control lever is stopped, the neutral point of the diagonal slot in the cam member 161 will immediately overtake the pin 169 to seat the balls 128 and thus stop piston movement. Should the manual control lever be accelerated from said uniform speed, the pin 169 would be advanced with respect to the advancing diagonal cam slot portion 165 to further unseat the balls 128 from their seats 129 to increase fluid flow and piston speed. Thus, within a speed range variable from zero to a maximum determined by the flow capacity of the valve parts 128—129, the manual control lever 54 is manipulatable at slow speeds to select slow speeds of piston adjustment. This slow speed of the piston is so coordinated with the speed of the lever 54 as to create the sensation that the parts moved by the piston are moved effortlessly by said lever. If the lever is accelerated, decelerated, or stopped, a like instantaneous response is incurred by the piston and the parts it drives. Because of the small flow capacity of the valve parts 128—129, the just explained force transmitter or piston movement control is tantamount to a vernier adjustment.

The speed at which the manual control lever 54 is adjusted in either direction also controls the speed and direction of the motor piston during operation of the apparatus in the high speed range, that is, while valve members 125, Figure 4, are unseated from their seats 126. The upper limit of said range is determined by the flow capacity of the valve parts 125—126 and the delivery capacity of the fluid source, and the speed within said range is selected by adjusting the distance the part 125 is unseated in the manner described above with respect to the balls 128. The control lever of course must be moved more rapidly while controlling the higher piston speeds. So long as this higher speed range limit is not exceeded the piston movement will be instantaneously responsive to speed and direction of the manual control lever.

It is also important to note that the speed control is ideally responsive to the muscular reflexes of an operator since it is natural for him to move the control lever faster or slower as faster or slower movement of the motor piston is desired. This operating characteristic of the apparatus is further highly desirable when making micrometric adjustments when the natural inclination of an operator is to move the control lever with a degree of slowness corresponding to the exactness sought. Greater exactness is attainable in setting the piston when it is moved slowly.

Referring now to Figures 2 and 8 to 11, inclusive, there is shown the distributing valve arrangement to which fluid is delivered from the fluid supply pump source under pressure and distributed for supplying fluid to two different fluid-operated devices, only one of which is shown. In these tractor-mounted arrangements it is customary to have implements or working tools located at opposite sides of the tractors and it is desirous that these working tools be operable independently of each other. For this purpose there are often provided two different cylinder devices for actuating the different tools. As viewed in Figure 8, it will be noted that there are two high pressure openings 170 and 171. The pressure opening 170 is for delivering fluid to the fluid-operating device 62, whereas the pressure opening 171 is for delivering fluid to a second fluid-operated device, not shown, for operating tools on the other side of the tractor. Fluid is supplied to this distributing valve and to this high pressure opening through a vertically extending opening or duct 172. Fluid is delivered from the pump source to the duct 172 through an attached coupling 173 which connects the supply hose 72 to the distributing valve 73. The views in Figure 8 show the distributing valve opened to illustrate the ducts and openings in its two parts 174 and 175, these views being elevational views of the individual parts 174 and 175 of which the latter is shown upside down in a position adapting the parts to be folded up together to form the composite distributing valve 73.

Fluid from the low pressure side of the fluid operated device or from the return hose coupling 75 is returned to the distributing device through openings 176 and 177. The opening 177 is utilized for adjusting working tools at the side of the tractor opposite to that shown in Figure 1. From this opening 177 the returning fluid will continue through a passage 178 in the distributing valve part 175 and thence upwardly through the pipe 51 to the reservoir 50.

Normally, fluid under pressure is delivered to the openings 170 and 171 through a round opening 179 and a duct 180 (in the form of a groove in the flat face of the part 174) which extends between the two openings 170 and 171. The path of fluid through the distributing valve is that taken by the arrows 181. When fluid is not being delivered to the fluid-operated device 62, the pressure in the duct 172 reaches sufficient magnitude that the fluid flows vertically through said duct 172 to an opening 182 in the part 175 to react against and open a by-pass ball valve 183 which is normally retained against its seat 184 by a compression spring 185 and a washer 186. Such fluid that by-passes this ball valve 82 will be delivered through a duct 187 to the duct 178 and from there returned to the fluid reservoir. It should be particularly apparent at this time that fluid is kept under pressure within the high pressure passages 172 and 180 at all times and that from these passages fluid pressure is extended to the fluid operated device whereby fluid is provided under pressure at a location within the cylinder structure itself and within a short distance from the openings 110 and 111 at the ends of the cylinder. In other words, fluid under pressure is always on tap for the fluid operated devices. This adds to the sensitivity of the fluid operated device and makes possible the use of the same for delicate adjustment of the working tools. The distributing valve parts 174 and 175 are held together by bolts 188 shown in section in Figure 8.

Associated on the quadrant 55 and pivoted at 58 is a gauge lever 271. This lever is such that it can be moved over the quadrant and selectively set thereon. Should the working tool be adjusted in its working position and later the same be raised to a position of transport on the tractor, said tool can be returned precisely to the said working position by returning the control lever to its initial position beside the lever 271. Thus, the lever 271 serves as a tell-tale stop against which the lever 54 can be set.

The present apparatus makes expedient use of fluid as a power transmitting medium for performing the actual work in manipulating and adjusting cumbersome or inaccessible parts or the like under remote manual supervision. Said apparatus is especially adapted for power control of the working tools on a tractor. The design and combination of the parts utilize high pressure fluid in a manner causing the remotely controlled tools or the like to move substantially simultaneously with and precisely in accordance with the movement of the manual lever 54. Any delay of movement between the manual lever 54 and the working tool is practically imperceptible. In other words, the movement of the working tool is as instantaneous as if a hand-operated adjusting lever were directly connected therewith.

Another important advantage of the present fluid control is its automatic restoration of the force transmitter 79 to any position to which it has been set, should it drift from such position because of fluid leakage at some point in the system as along the cylinder wall from one side of the force transmitter to the other. Fortuitous drifting of the force transmitter in either direction will incur a movement of the diagonal cam slot 165 relatively to the pin 169 therein for setting the valve means to reestablish the fluid distribution in the cylinder and thus correct the force transmitter setting. Automatic corrections of this kind will occur at intervals determined by the speed at which an impairment or imperfection of the system may allow drifting of the force transmitter.

While I have shown and described but a single preferred embodiment, it should be understood that many changes may be made in the construction, details and arrangement of the parts without departing from the spirit and scope of the present invention or sacrificing all of the advantages thereof.

What is claimed is:

1. In a mechanical organization for the practice of a new tillage technique; a tractor; a tillage tool disposed on said tractor for movement between a lowered field tillage position and an elevated transport position and for depth adjustment within the tillage position; a power transmitting mechanism, said mechanism including a motor energized by power received from the tractor power plant, said motor being selectively energizable for moving a work member thereof in either of opposite directions and effective to lock said work member against movement excepting during such energization, said mechanism also including a control member movable in either of opposite directions to incur energization of said motor for moving its work member coordinately in direction and amount with the movement of such control member; and means connecting said work member with said tool to respectively raise and lower the same pursuant to the movement of the work member in opposite directions, whereby movement of the control member within one zone of its movement range will positively incur tool tillage depth adjustment correlated in either didection and amount with the movement of said member and whereby movement of the control member into another zone of such movement range will incur movement of the tool into the transport position.

2. In a mechanical organization for the practice of a new tillage technique; a tractor, a tillage tool disposed on said tractor for movement between a lowered field tillage position and an elevated transport position and for depth adjustment within the tillage position; a hydraulic power transmitting mechanism including a hydraulic motor into which propelling liquid for driving the same is introduced by power obtained from the tractor power plant, said motor being drivable in opposite directions by respective modes of liquid introduction thereinto and being hydraulically lockable against drive in either direction by precluding egress of such liquid therefrom, valve means for controlling ingress and egress of the liquid with respect to the motor, said valve means being settable in a neutral condition to prevent such egress and alternatively settable in delivery conditions which cause the introduction of fluid into the motor for driving the same respectively oppositely, relatively movable valve means control counterparts of which one is manually operated and the other driven by the motor and cooperable for setting the valve means to cause the motor to effect drive in an amount and direction correlated with the amount and direction of movement of the manually operated counterpart and to hydraulically lock the motor as aforesaid following completion of each correlated movement; and means operably connecting said motor with said tool to respectively raise and lower the same pursuant to drive of the motor in opposite directions, whereby movement of the manual counterpart within one zone of its movement range can positively incur tool tillage depth adjustment correlated in direction and amount with the movement of the manual counterpart and whereby movement of said counterpart into another zone of its movement range will incur movement of the tool into the transport position.

3. In a mechanical organization for the practice of a new tillage technique; a tractor; a tillage tool disposed on said tractor for movement between a lowered field tillage position and an elevated transport position and for depth adjustment within the tillage position; a hydraulic power transmitting mechanism comprising a pump driven by the tractor engine, a control member manually movable in selective opposite directions, a fluid-driven motor including a work member positively movable in either of opposite directions by selective directing of liquid into such motor from the pump and hydraulically lockable against movement in either direction at selective points in its path of movement by the trapping of liquid in said motor, valve means operable under control of said manual control member and of said work member to effect such directing and trapping of the liquid, connecting means operably connecting said members with the valve means, said manual control member being operable through said connecting means to operate the valve means for directing the liquid into the motor to initiate an ensuing movement of the work member correlated in direction with the direction of the control member movement, the work member being operable through said connecting means to operate the valve means for hydraulically locking the said work member incident to its said ensuing movement reaching an amount correlated with the amount of control member movement; and means connecting said work member with said tool for raising and lowering the same pursuant to movement of said work member in its respectively opposite directions, whereby movement of the control member within one part of its movement range will positively incur tool tillage depth adjustment correlated in either direction and amount with the movement of such control member and whereby movement of the control member into another part of its movement range will incur movement of the tool into the transport position, and said connecting means between the valve means and said control member being constructed and arranged to accommodate instantaneous manual movement of the control member selectively in its range in advance of the ensuing correlated movement of the tool at a speed functional of liquid delivery to the motor.

4. In a mechanical organization for the practice of a new tillage technique; a vehicle having an associated power plant from which power is obtained for propulsion of such vehicle across a tillable field; a tillage tool on said vehicle for movement between transport and soil-working positions and for depth adjusting movement within the soil-working position; and a hydraulic system for effecting and controlling such tool movements, comprising a hydraulic pump driven from said power plant, a fluid-driven motor including a work member connected with said tool and movable in opposite directions to respectively lower and raise the same, said work member being subjectable to liquid columns at opposite sides thereof to alternately drive the same in opposite directions by the alternate application to said columns of the pressure of liquid from said pump while the other of said columns is allowed to exhaust, and valve means disposed between said pump and said motor, said valve means comprising independently movable counterparts disposable in a neutral setting relatively to one another to condition the valve means for preventing exhaust of either of said liquid columns from the motor to thus hydraulically lock said work member, one of said counterparts being manually movable from the neutral setting to manipulate the valve means for selectively subjecting said liquid columns to the pumped liquid while connecting the nonsubjected column with exhaust, and the other of said counterparts being connected for movement with the work member in its ensuing movement to reestablish the neutral setting of said counterparts upon movement of the work member and tool an amount correlated with the amount and direction of movement of the manually moved counterpart.

5. In a mechanical organization for the practice of a new tillage technique; a tractor; a tillage tool disposed on said tractor for movement between a lowered field tillage position and an elevated transport position and for depth adjustment within the tillage position; a hydraulic power transmitting mechanism including a hydraulic motor into which propelling liquid for driving the same is introduced by power obtained from the tractor power plant, said motor being drivable in opposite directions by respective modes of liquid introduction thereinto and being hydraulically lockable against drive in either direction by the preclusion of egress of such liquid therefrom, valve means for controlling ingress and egress of the liquid with respect to the motor, said valve means being settable in a neutral condition to prevent such egress and alternatively placeable in delivery conditions which cause the introduction of liquid into the motor for driving the same respectively oppositely, said valve means including successively operable stages of relatively small and large flow capacity and being controllable to vary the rate of flow in each stage, and valve-operating means including a manual component manipulatable for placing the valve means in selected of said delivery conditions to determine the direction of motor drive and a component driven by the motor for resetting the valve means to the neutral condition, said valve-operating means components being cooperable for rendering the flow capacity stages of either delivery condition as well as the flow rate within the selected stage selective under control of said manual component for causing the motor to drive at desired speeds in direction and distance correlated with the speed, direction, and distance of the manual component manipulation; and means operably connecting the motor with said tool to raise and lower the same pursuant to and in accordance with the speed and distance of drive of the motor in its respective opposite directions.

CARL W. MOTT.